(12) United States Patent
Ben-David et al.

(10) Patent No.: US 11,957,278 B2
(45) Date of Patent: Apr. 16, 2024

(54) RFID TAGGED AND IDENTIFIED COOKWARE IN ROBOTIC OR AUTOMATED COOKING SYSTEM

(71) Applicant: Kitchen Robotics Ltd, Modiin (IL)

(72) Inventors: David Ben-David, Rehovot (IL); Yair Gordin, Modiin (IL)

(*) Notice: Subject to any disclaimer, the term of this patent is extended or adjusted under 35 U.S.C. 154(b) by 574 days.

(21) Appl. No.: 17/302,548

(22) Filed: May 6, 2021

(65) Prior Publication Data

US 2022/0354311 A1    Nov. 10, 2022

(51) Int. Cl.
| A47J 44/00 | (2006.01) |
| B25J 11/00 | (2006.01) |
| G06K 7/08 | (2006.01) |
| G06K 19/077 | (2006.01) |
| G06K 19/07 | (2006.01) |

(52) U.S. Cl.
CPC .......... *A47J 44/00* (2013.01); *B25J 11/0045* (2013.01); *G06K 7/086* (2013.01); *G06K 19/0776* (2013.01); *G06K 19/0723* (2013.01)

(58) Field of Classification Search
CPC ....... A47J 44/00; B25J 11/0045; G06K 7/086; G06K 19/0776; G06K 19/0723

USPC .......................................................... 99/325
See application file for complete search history.

(56) References Cited

U.S. PATENT DOCUMENTS

| 3,816,708 | A | * | 6/1974 | Walton | ................... G06K 7/086 |
| | | | | | 340/10.2 |
| 6,953,919 | B2 | | 10/2005 | Clothier | |
| 11,436,568 | B2 | * | 9/2022 | Nottingham | ........... G06Q 20/18 |
| 11,805,941 | B1 | * | 11/2023 | He | ............................. A23L 5/10 |
| 2010/0259393 | A1 | | 10/2010 | Prieto | |
| 2014/0230660 | A1 | * | 8/2014 | He | ........................... A47J 27/14 |
| | | | | | 99/325 |
| 2018/0173896 | A1 | * | 6/2018 | Arneson | ............. G06F 21/6254 |
| 2020/0037824 | A1 | * | 2/2020 | Moon | ...................... A47J 44/00 |
| 2021/0196081 | A1 | * | 7/2021 | Kodali | .................... A47J 44/00 |

FOREIGN PATENT DOCUMENTS

EP          1591049         11/2005

* cited by examiner

*Primary Examiner* — Omar Flores Sanchez
(74) *Attorney, Agent, or Firm* — Haim M. Factor; 1st-Tech-Ideas.com

(57) ABSTRACT

The present invention relates to an RFID tagged and identified cookware in robotic or automated cooking system for identification of each one of the cooking vessels throughout the variety of stages of the cooking processes or meal preparation processes in automated or robotic cooking apparatus through an integrated RFID tag.

17 Claims, 1 Drawing Sheet

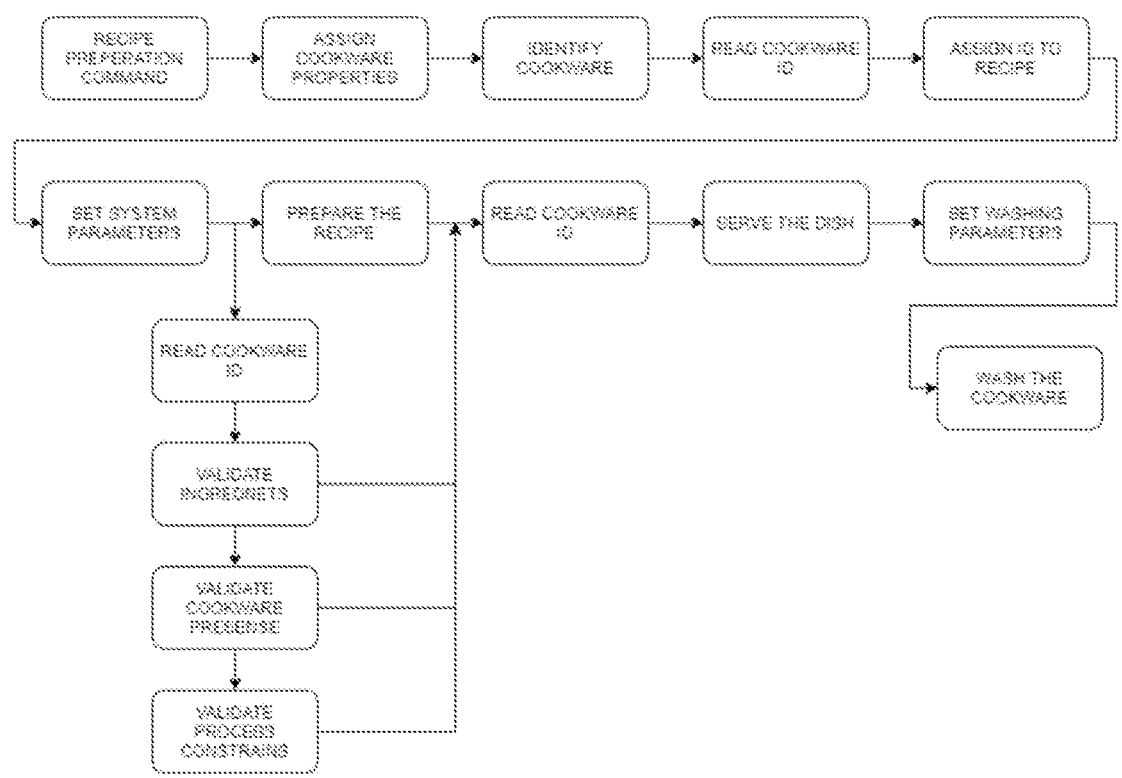

RFID TAGGED AND IDENTIFIED COOKWARE IN ROBOTIC OR AUTOMATED COOKING SYSTEM

FIELD OF THE INVENTION

The present invention relates to an RFID tagged and identified cookware in robotic or automated cooking system involving identification of each one of the cooking vessels throughout the variety of stages of the cooking processes or meal preparation processes in automated or robotic cooking apparatus. More particularly the invention relates to the use of Radio-frequency identification (RFID), which uses electromagnetic fields to automatically identify and track tags attached to cooking vessels or cookware.

BACKGROUND OF THE INVENTION

A variety of cooking vessels such as pots and pans are normally used in manual and automated or robotic cooking processes. Usage of multiple cooking vessels or cookware in manual or automatic cooking processes introduces a challenge in cookware identification. Further, incorporated of these in automated or robotic cooking systems, wherein, these undergo variety of processes, such as, heating, freezing, washing, sanitation entails considerable identification problems. The problem exacerbate upon manipulation of a variety of motion systems, gripped and repositioned by variety of mechanisms. Moreover, in automated or robotic cooking systems, an interface is often essential between the cookware, being a passive part of the system, and the system controller. Such interface is essential for processes optimization, production tracking and monitoring, process data collection and optimization. Further, being a passive element of the systems, the cooking vessel serves a crucial role in process control and optimization, thus requiring a communication interface for identification, and for receiving and sending data.

EP1591049A1 titled, "Radio frequency identification controlled heatable objects" discusses a temperature controlled heatable object (10) in which a temperature sensor (70) is connected to a Radio Frequency Identification (RFID) tag (60). The RFID tag (60) is located within the handle (40) of the object (10), and the temperature sensor (70) is placed in contact with the object (10). In a first embodiment of the invention, the temperature sensor (70) is partially imbedded within the object (10) via a notch (22) located in the side of the object (10). In a second embodiment of the invention, a temperature sensor (70) is imbedded within a tunnel (122) drilled within the base of the object (110). In a third embodiment, a temperature sensor (70) is imbedded between the bottom of the object (210) and a slab (226) attached to the bottom of the object (210). The sensor (70) can be located in a slot (222) formed in either the slab (226) or the bottom or the object (210). Handles (40,140) and receivers (30,130,230) for mounting the handles (40, 140) to the temperature controllable objects (10,110,210) are also provided.

U.S. Pat. No. 6,953,919B2 titled "RFID-controlled smart range and method of cooking and heating" talks of a system and method for providing multiple cooking modes and an ability to automatically heat cooking vessels and other objects using RFID technology, and an ability to read and write heating instructions and to interactively assist in their execution. An induction heating range is provided with two antennas per hob, and includes a user interface display and input mechanism. The vessel includes an RFID tag and a temperature sensor. In a first cooking mode, a recipe is read by the range and the range assists a user in executing the recipe by automatically heating the vessel to specified temperatures and by prompting the user to add ingredients. The recipe is written to the RFID tag so that if the vessel is moved to another hob, into which the recipe has not been read, the new hob can read the recipe from the RFID tag and continue in its execution.

US20100259393A1 titled, "Encapsulated RFID tags and methods of making same" is about an encapsulated radio frequency identification (RFID) articles having enhanced break strength and/or temperature resistance and methods of making these articles. The RFID articles include an RFID tag embedded within a thermoplastic substrate to form the RFID article. In one embodiment, the RFID article includes an over-molded barrier material that enables the RFID article to have enhanced temperature resistance such that the articles are able to sustain repeated exposure to high temperatures and/or sterilization procedures, thereby enabling the RFID articles to be utilized in applications heretofore unavailable. In other embodiments, the RFID articles are made using an injection molding process that provides very thin encapsulated RFID tags that also exhibit an increased level of temperature resistance.

In none of the above patents, the use of passive element in process control and optimization apart from allowing communication interface for identification, and for receiving and sending data is seen thereby relegating the efficiency of these system substantially. The present method is an effort towards incorporating passive element in the identification process to make the automatic/robotic cooking process more efficient.

SUMMARY OF THE INVENTION

An aspect of the present invention is to provides a method of implementing cooking process in robotic and automatic cooking apparatus through integration of RFID tag. The present invention provides a method for automated or robotic cooking apparatus to identify each of the cooking vessels throughout the variety of stages of the cooking processes or meal preparation processes.

Another aspect of the invention is to provide an interface which functions passively in the system and which is often essential between the cookware, and the system controller. Such interface is essential for processes optimization, production tracking and monitoring, process data collection and optimization. The above passive element of the systems, enable the cooking vessels to serve as a crucial role in process control and optimization, thus requiring a communication interface for identification, and for receiving and sending data.

A still further aspect of the invention is the usage of Radio-frequency identification (RFID), which uses electromagnetic fields to automatically identify and track tags attached to objects.

Another aspect of the invention is the usage of RFID reader and writer with a communication port, connected to system controller or PC. The communication port enables connectivity and data transfer between the system controller or PC and the RFID reader or writer.

A further aspect of the invention is the usage of RFID tags, attached to the outer surface of the cooking vessel or embedded into a cooking vessel or in one of the features of the cooking vessel, such a handle.

A still further aspect of the invention is defining or choosing a RFID tag compliant for the robotic or automated systems processes.

A further aspect of the invention is defining or choosing an operating frequency of the RFID tag. Low frequency, high frequency or ultra high frequency tags can be used depending upon the system requirements.

A still further aspect of the invention is positioning the RFID tag on the cookware depending upon the robotic system or automated system requirements. The tag might be glued, mechanically fixed or attached.

A further aspect of the invention is shielding the RFID tag from electromagnetic interferences which might be generated from various sources within the robotic system or its environment, such as inductions ranges, widely used as cooking heat source.

A still further aspect of the invention is detecting the presence of the cookware in a robotic or automated systems through the RFID tag, attached to a cookware in a robotic or automated systems, which may also serve as a verification mechanism, for detecting the presence of the cookware.

A still further aspect of the invention is assigning a unique ID to cooking vessels or cookware, being used by robotic or automated systems. The present invention assigns a unique ID to a cookware during one or more stages of workflow, by transmitting specific data set using an RFID writer. The assigned ID is read by the robotic system during one or more processes in the workflow for transferring data or for verification purposes.

A further aspect of the invention is associating cookware type and properties to the assigned ID. Reading the cookware properties and transmitting them to the system controller, might enable optimizing the cooking cycle.

A still further aspect of the invention is cookware identification by robotic or automated system user or operator.

A still further aspect of the invention is assigning or writing data to a tag attached to a cookware. The data might be assigned by an RFID writer, incorporated in a robotic or automated system and which might be transmitted to the RFID reader/writer by a system controller or PC.

A still further aspect of the invention is maintenance tracking in the robotic or automated systems, where the cookware of these systems are subject to various types of wear & tear over time.

A further aspect of the invention is assigning a specific cookware to specific recipe.

BRIEF DESCRIPTION OF THE DRAWING

FIG. 1 is a flowchart representing a method for automated or robotic cooking involving identification of each one of the cooking vessels in the process of cooking.

DETAILED DESCRIPTION OF THE PREFERRED EMBODIMENTS

The present invention provides a method for cookware identification in automated or robotic cooking systems. Automated or robotic cooking systems or cooking apparatuses might incorporate multiple cooking vessels or cookware, such as but not limited to, pots and pans, having similar appearance. The present invention provides a method for the manual, automated or robotic cooking apparatus, as the case may be to identify each one of the cooking vessels throughout the variety of stages of the cooking processes or meal preparation processes. These processes might be heating, cooling and freezing, rotation of the vessel, manipulation and repositioning of the vessel, food ingredient collection, washing and sanitation, serving, labeling and packing of the prepared meal. Further, during serving of a meal, accomplished through a robotic or automatic system, an element of manual intervention can be embodied through scanning of the cookware so as to identify the recipe prepared in it.

Assigning Cookware Properties

In robotic cooking systems or cooking apparatuses, each process involves a number of parameters to be taken into account depending upon the recipe requirements. Hence a specific command needs to be sent to the controller. For example, when the recipe is to be cooked in a cooking apparatus comprising an air fryer, a rotating pot and an induction cooker, parametres such as, but not limited to air temperature, air stream duration and frequency, induction power level, pot rotational velocity, pot rotational direction for a specific recipe needs to be set, for reduction in the meal preparation duration, and providing meal consistency and flavor.

Apart from the above parameters, other details such as cooking modes, cookware requirements, the geometry and material of the cookware varies depending upon the recipe to be cooked. These parameters also need to be fed to the apparatus. These are taken care of by providing a cookware identification method which utilizes Radio-frequency identification (RFID) passive tag.

In the automated and robotic cooking process, a command for a dish preparation, involves amongst others, assigning of a cookware identification that integrates with the said robotic and automatic cooking process to prepare a dish and thereafter, washing of the cookware through a distinct process. The cookware identification embodies data on a plurality of parameters defining the properties of the cookware along with the associated attributes that are required for integration of the dish making command process. The identification of the cookware through an RFID passive tag embodies information, such as but not limited to, cookware ID, cookware type, cookware properties and limitations, process data and recipe data Information.

Identifying Cookware

As mentioned above, identifying the cookware by utilizing RFID technology, involves using electromagnetic fields to automatically identify and track tags attached to objects as is known in the art. The RFID technology consists of a radio receiver and transmitter and a tiny radio transponder or a tag. In the present invention passive tags are used. Passive tags are powered by energy from the RFID reader's interrogating radio waves.

When RFID reader and writer is used with a communication port which is being connected to system controller or PC, the communication port enables connectivity and data transfer between the system controller or PC and the RFID reader or writer. The data set to be written to the RFID tag on a specific cookware might be transferred from the system controller to the RFID reader/writer using a communication protocol, such as but not limited to, Modbus RTU, EtherCAT, CanOpen.

Assigning Data to RFID Tag

Once the tag is allocated to a particular cookware, the next step is that of assigning or writing data to the tag attached to a cookware, such as but not limited to, time stamp, cookware physical properties, system identification data, system installation site identification data, recipe, cookware process limits, such as maximum allowed exposure temperature and chemical exposure limitations. The data might be assigned by an RFID writer, incorporated in a robotic or automated system. The data might be transmitted to the RFID reader/writer by a system controller or PC.

Assigning ID to Cooking Vessels

Assigning or writing data to the tag attached to the cooking vessel or a cookware also involves assigning a unique ID to cooking vessels or cookware, being used by a robotic or automated system. Robotic or automated systems' workflow might include, ingredient collection, cooking, washing, sanitizing, drying, serving, handling and positioning processes. The present invention assigns a unique ID to a cookware during one or more stages of such workflow, by transmitting specific data set using an RFID writer. The assigned ID might be read by the robotic system during one or more processes in the workflow for transferring data or verification purposes. For example, if a unique ID is assigned to a cookware, a specific recipe might be associated to this ID. Thus, after meal preparation and serving, washing parameters might be optimized by reading the cookware ID. Identifying the recipe ingredient used, cooking processes and conditions, might enable altering, for example, the washing duration, water temperature or detergent type and amount.

The present invention, further involves reading the cookware assigned ID. This enables the robotic or automated system to use a specific cookware for specific recipes. An example of such case would be preparation of a salad recipe vs. a pasta recipe. Since a salad recipe preparation might not include cooking, a plastic cookware might be used for example, for the recipe preparation. However, the pasta recipe, which includes a cooking cycle, required a metal cookware, for example. Thus, a robotic system with a capability to differentiate between the cookware types by reading the unique ID associated to the specific cookware, might use the plastic cookware for the salad recipe and the metal cookware for the pasta recipe.

Further, the robotic system, in its one or more processes of workflow may involve a variety of cookware including pots, pans and containers which may or may not be induction compatible cookware, may have different geometry and physical properties, depending upon the type of recipe. The washing and sanitization parametres such as but not limited to water pressure, flow, heating temperature and durations for achieving acceptable performance, also varies depending upon the variety of cookware and the recipe cooked and which can be identified by the unique ID assigned to the cookware.

Setting System Parametres

System parameters might refer to, for example, cooking time, cooking intensity or power, washer rinsing time, washing liquid temperature or composition, motion axis velocity, motion axis acceleration. These parameters are derivatives of the cookware properties, such as weight, geometry, type and material. Assigning a unique ID to the cookware in a robotic or automated system, using RFID, enables adjustment and optimization of the system parameters, listed above, thus enhancing system performance and functionality. For example, light weight cookware can be moved and manipulated faster than a heavy weight one, considering the effect of the cookware weight on the motion system inertia. Another example would be washing time—identifying a cookware and the ingredients cooked in it, enables increasing washing cycle duration, due to harsh cookware contamination.

Validating Process Constraints

An example of process validation would be transferring the cookware from one location to another by a robotic system motion system. Reading the RFID passive tag on the cookware at the destination coordinates might provide a feedback on a successful motion command, returning to system controller that the cookware was delivered to desired location. This, in addition to any possible motion system feedback, indicating that the motion system reached the desired coordinates. Yet another example could be ingredient collection. By reading the cookware unique ID prior to ingredient dispensing in a robotic system, the system controller can verify that the ingredient about to be dispensed, can and should be actually dispensed to the cookware. Thus, when preparing a recipe with allergenic restrictions, for example, fault dispensing of the allergen can be avoided.

In some embodiments of the present invention, a unique ID assigned to a cookware might be read by the user for identification of the cookware. This may be viable in cases where manual operations are involved in automated meal preparation, for example manual serving, handling multiple cookware units or manual maintenance operations, where the user may be the user or operator of the robotic or automated system operated or.

Validation of Cookware Presence and Execution of Command

In the method of the present invention, reading an RFID tag, attached to a cookware in a robotic or automated systems, might serve as a verification mechanism as well for detecting the presence of the cookware. Such detection mechanism might be used, for example, during manipulating the cookware, gripping it and positioning in place. Reading the RFID tag on the specific cookware might serve as a verification of a successfully executed command. For example, robotic motion system, such as a multiple axis gantry system or a robotic arm, placing the cookware on an induction cooker. Reading the tag, might indicate a successfully placed cookware on the induction cooker, thus validating the motion command.

Tracking Maintenance of Cookware

Assigning the cookware with a unique ID also helps in maintenance tracking. In robotic or automated systems, various types of wear might occur on the cookware over time. The RFID reader/writer reads the cookware ID every cooking cycle, communicating the information to the system controller, which might be set to record this data. By pre-setting a cookware life span or maintenance period, a system will notify upon required maintenance or replacement, preventing system down time, or degradation in cookware performance.

In some embodiments of the present invention, the RFID tags may be attached to the outer surface of the cooking vessel or embedded into a cooking vessel or in one of the features of the cooking vessel, such a handle.

In some other embodiments, the RFID tags might differ in size and geometry to fit the cooking vessel requirements.

In some embodiments of the present invention, an RFID tag is chosen depending upon the cooking vessel requirements which is derived from the robotic or automated system processes. The physical properties of passive RFID tag such as type, size and geometry apart from the chemical properties will be ascertained upon the cooking vessel requirements. For example, for cooking applications, a heat resistant passive tag must be used, capable of operating in high temperatures such as 160° C., or 200° C., or 250° C. Another example would be a washing application, such as a commercial dish washer or a washing module, integrated in a robotic or automated system. In such case, the passive tag must be chemical resistant or water resistant or high temperature resistant, or all the above.

The positioning of the RFID tag on the cooking vessel or cookware depends upon the fulfillment of requirements derived from the robotic system or automated system requirements such as process requirements, functional requirements and maintenance requirements.

In some embodiments the method of fixing of the tag on the cookware may vary and may be mechanically fixed or attached or may be be glued.

The choice of RFID tag depends upon its operating frequency. The available frequencies of RFID tags usually fall under Low frequency, High frequency and Ultra High frequency tags. High frequency tags, for example, contain a sub-category of NFC tags, operating in a very specific subset of the high-frequency range −13.56 MHz. NFC tags have two-way reading and writing capabilities, with small reading and writing ranges and high memory capacity and hence, these tags will be used accordingly where both reading and writing capabilities of the RFID tags are required in the cookware. The required operating frequency of the RFID tag is derived from system requirements such as robotic or automated system dimensions, reading or writing range, compliance to local regulations, memory capabilities, resistance to interference by liquids and metals, reading and writing rates and cost.

Another requirement of the present invention is shielding the RFID tag from electromagnetic interferences, since, close proximity of an RFID tag to an electromagnetic field might cause data loss, damage or failure of the tag. It is to be understood that, in the present invention, electromagnetic field might be generated from various sources within the robotic system or its environment, such as induction ranges, widely used as cooking heat source. For example, 2000W induction range will cause damage to UHF RFID tag with proximity of 100 mm and less. Therefore, in the present invention, the RFID tag is positioned on a cookware considering the proximity to electromagnetic field and its intensity. Following the previous example, the RFID tag will be attached to a cooking pot with compliance of minimum 100 mm distance between the cooking pot bottom and the tag, considering that the pot bottom is adjacent to the induction range.

The present disclosed subject matter may be a system, a method, and/or a computer program product. The computer program product may include a computer readable storage medium (or media) having computer readable program instructions thereon for causing a processor to carry out aspects of the present disclosed subject matter. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter. Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method of implementing a cooking process in a robotic and automatic cooking apparatus through integration of an RFID tag, the method comprising the steps of:
   a) receiving a recipe preparation command from an external storage medium via a system controller;
   b) assigning a set of cookware properties in the integrated RFID tag, depending upon recipe requirements;
   c) identifying a cookware to be used for the recipe and allocating a cookware ID to the RFID tag;
   d) reading the cookware ID from the RFID tag;
   e) assigning an ID to the recipe;
   f) setting system parameters before commencement of recipe preparation and assigning of cookware ID;
   g) preparing the recipe according to the instructions received in steps (a), (b) and (f);
   h) reading the cookware ID from the RFID tag;
   i) serving the dish prepared in step (g);
   j) setting washing parameters to be transferred to the RFID tag via the system controller; and
   k) washing the cookware depending upon the set parameters of washing.

2. The method of claim 1, wherein the system parameters are derivatives of the cookware properties including at least one of; weight, geometry, and material.

3. The method of claim 1, wherein the setting of system parameters includes at least one of: cooking modes, ingredients, an induction power level, a rotational velocity of a pot, a rotational direction of the pot, an air temperature, and an air stream duration and frequency.

4. The method of claim 1, wherein the setting of system parameters further includes at least one of: a cooking time, a cooking intensity and power, a washer rinsing time, a washing liquid temperature and composition, a motion axis velocity, and a motion axis acceleration.

5. The method of claim 1, wherein identification of cookware based on the recipe includes a geometry and a material of the cookware.

6. The method of claim 1, wherein the commencement of step (g) further comprises a step of validation after reading the allocated cookware ID in step (c).

7. The method of claim 6, wherein the step of validation includes validating:
   (a) a presence of recipe ingredients;
   (b) a presence of the cookware;
   (c) process constraints; and
   (d) execution of commands.

8. The method of claim 1, wherein the RFID tag is a passive RFID tag.

9. The method of claim 1, wherein the RFID tag is attached to an outer surface of the cookware or embedded into the cookware or in one of the features of the cookware.

10. The method of claim 1, wherein a geometry and a size of the RFID tag differ to fit the cooking vessel requirements.

11. The method of claim 8, wherein physical and chemical properties of the passive RFID tag is ascertained on cookware requirements.

12. The method of claim 1, wherein positioning of the RFID tag on the cookware depends upon the fulfillment of requirements derived from requirements of the robotic or automated apparatus, such as process requirements, functional requirements, and maintenance requirements.

13. The method of claim 1, wherein the RFID tag is attached mechanically or glued onto the cookware.

14. The method of claim 1, wherein a type of RFID tag chosen depends upon an operating frequency of the RFID tag.

15. The method of claim 14, wherein the operating frequency depends upon dimensions of the robotic or automated apparatus, a reading or writing-range, compliance with local regulations, memory capabilities, a resistance to interference by liquids and metals, reading and writing rates, and a cost.

16. The method of claim 15, which further includes scanning of the RFID integrated cookware by a user for identification of contents of the cookware for manual operations involving at least one of a serving or a labelling.

17. A method of maintenance tracking of a cookware in a robotic and automatic cooking apparatus through integration of an RFID tag, the method comprising the steps of:
   a) pre-setting a cookware maintenance period in a cooking cycle;
   b) reading/writing a cookware ID in the cooking cycle and recording the information;
   c) communicating the read/written data to a system controller; and
   d) receiving notification from the system controller upon requirement of maintenance or replacement of the cookware, thereby preventing system down time, or degradation in cookware performance.

\* \* \* \* \*